United States Patent
Yi et al.

(10) Patent No.: US 12,293,223 B2
(45) Date of Patent: May 6, 2025

(54) CLOUD COMPUTING RESOURCE BASED ON TYPE OF TASKS AND RESOURCE LOAD RATE

(71) Applicant: Huawei Cloud Computing Technologies Co., Ltd., Gui'an, New District (CN)

(72) Inventors: Xiaomeng Yi, Shenzhen (CN); Jiongjiong Gu, Shenzhen (CN)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 604 days.

(21) Appl. No.: 17/199,121

(22) Filed: Mar. 11, 2021

(65) Prior Publication Data
US 2021/0200587 A1 Jul. 1, 2021

Related U.S. Application Data

(63) Continuation of application No. PCT/CN2019/090886, filed on Jun. 12, 2019.

(30) Foreign Application Priority Data

Sep. 11, 2018 (CN) .......................... 201811055961.7

(51) Int. Cl.
*G06F 9/48* (2006.01)
*G06F 9/50* (2006.01)
(Continued)

(52) U.S. Cl.
CPC .......... *G06F 9/4887* (2013.01); *G06F 9/4843* (2013.01); *G06F 9/4881* (2013.01);
(Continued)

(58) Field of Classification Search
None
See application file for complete search history.

(56) References Cited

U.S. PATENT DOCUMENTS 7,137,119 B1 * 11/2006 Sankaranarayan ... G06F 9/5011
718/103
9,262,224 B2 2/2016 Koza
(Continued)

FOREIGN PATENT DOCUMENTS

CN 102937912 A 2/2013
CN 103795804 A 5/2014
(Continued)

OTHER PUBLICATIONS

CN/202110542672, Office Action, Dec. 12, 2024.

*Primary Examiner* — Abu Zar Ghaffari
(74) *Attorney, Agent, or Firm* — Leydig, Voit & Mayer, Ltd.

(57) ABSTRACT

This application provides a resource scheduling method, including: when a first scheduling request message is obtained, determining a first resource server from a resource pool based on a first quantity of resources requested by the first scheduling request message, and scheduling the first quantity of resources in the first resource server, where the resource pool includes at least one resource server, and the first scheduling request message requests a resource for a first-type task; and when a second scheduling request message is obtained, schedule a resource for a task corresponding to the second scheduling request message, determining a second resource server from the resource pool based on a second quantity of resources requested by the second scheduling request message, and scheduling a third quantity of resources in the second resource server, wherein the second scheduling request message requests a resource for a second-type task.

17 Claims, 9 Drawing Sheets

(51) Int. Cl.
*G06F 9/54* (2006.01)
*H04L 41/5051* (2022.01)
*H04L 67/1008* (2022.01)
*H04L 67/1029* (2022.01)
*H04L 67/1014* (2022.01)

(52) U.S. Cl.
CPC ............ *G06F 9/505* (2013.01); *G06F 9/5083* (2013.01); *G06F 9/546* (2013.01); *H04L 41/5051* (2013.01); *H04L 67/1008* (2013.01); *H04L 67/1029* (2013.01); *G06F 9/4812* (2013.01); *G06F 9/5072* (2013.01); *G06F 2209/5011* (2013.01); *H04L 67/1014* (2013.01)

(56) References Cited

U.S. PATENT DOCUMENTS

| | | | |
|---|---|---|---|
| 9,678,796 | B2 | 6/2017 | Mukherjee et al. |
| 9,749,208 | B2 * | 8/2017 | Skjolsvold .......... H04L 43/0876 |
| 10,514,960 | B2 * | 12/2019 | Cropper ................ G06F 9/5077 |
| 11,068,317 | B2 * | 7/2021 | Matsuura .................. G06F 9/48 |
| 11,134,013 | B1 * | 9/2021 | Allen ..................... G06F 9/5072 |
| 11,720,403 | B2 * | 8/2023 | Duleba ................. G06F 9/5077 |
| | | | 718/1 |
| 2003/0084088 | A1 * | 5/2003 | Shaffer ................. G06F 9/5044 |
| | | | 718/104 |
| 2005/0108582 | A1 * | 5/2005 | Fung .................... G06F 1/3209 |
| | | | 713/300 |
| 2006/0224706 | A1 * | 10/2006 | Kudo ................. H04L 67/1001 |
| | | | 709/220 |
| 2006/0259733 | A1 * | 11/2006 | Yamazaki ........... G06F 12/0842 |
| | | | 711/E12.039 |
| 2007/0016907 | A1 * | 1/2007 | Benedetti .............. G06F 9/5072 |
| | | | 718/104 |
| 2009/0183168 | A1 * | 7/2009 | Uchida ................. G06F 9/5027 |
| | | | 718/104 |
| 2012/0324469 | A1 * | 12/2012 | Nishihara ................. G06F 9/50 |
| | | | 718/104 |
| 2013/0042251 | A1 * | 2/2013 | Nader ................... G06F 9/4881 |
| | | | 718/103 |
| 2013/0179574 | A1 * | 7/2013 | Calder ................ G06F 9/45533 |
| | | | 709/226 |
| 2014/0164623 | A1 * | 6/2014 | Galan ..................... H04L 47/70 |
| | | | 709/226 |
| 2014/0229221 | A1 * | 8/2014 | Shih ................. G06Q 10/06312 |
| | | | 705/7.23 |
| 2016/0224387 | A1 * | 8/2016 | Zhou ..................... G06F 9/5083 |
| 2017/0012892 | A1 * | 1/2017 | Zhang ................... G06F 9/5061 |
| 2017/0220392 | A1 * | 8/2017 | Cropper ................ G06F 9/5011 |
| 2017/0250922 | A1 * | 8/2017 | Madduri ................. H04L 47/83 |
| 2018/0321971 | A1 * | 11/2018 | Bahramshahry ...... G06F 9/4881 |
| 2018/0341524 | A1 * | 11/2018 | Sarma ................... G06F 9/4881 |
| 2019/0391851 | A1 * | 12/2019 | Franciosi .............. G06F 9/5077 |
| 2020/0252945 | A1 * | 8/2020 | Jiang ................ H04W 72/0446 |

FOREIGN PATENT DOCUMENTS

| | | |
|---|---|---|
| CN | 104079503 A | 10/2014 |
| CN | 106156115 A | 11/2016 |
| CN | 106201723 A | 12/2016 |
| CN | 107018091 A | 8/2017 |
| CN | 107357661 A | 11/2017 |
| CN | 107634978 A | 1/2018 |
| CN | 108268318 A | 7/2018 |
| CN | 108429631 A | 8/2018 |
| CN | 109298936 A | 2/2019 |

* cited by examiner

When a first scheduling request message is obtained, determine a first resource server from a resource pool based on a first quantity of resources requested by the first scheduling request message, and schedule the first quantity of resources in the first resource server, where the resource pool includes at least one resource server, and the first scheduling request message is used to request a resource for a first-type task ⟶ 201

When a second scheduling request message is obtained, if it is determined to schedule a resource for a task corresponding to the second scheduling request message based on a resource load rate of the resource pool, determine a second resource server from the resource pool based on a second quantity of resources requested by the second scheduling request message, and schedule a third quantity of resources in the second resource server, where the third quantity is less than or equal to the second quantity, and the second scheduling request message is used to request a resource for a second-type task ⟶ 202

FIG. 2

CLOUD COMPUTING RESOURCE BASED ON TYPE OF TASKS AND RESOURCE LOAD RATE

CROSS-REFERENCE TO RELATED APPLICATIONS

This application is a continuation of International Application No. PCT/CN2019/090886, filed on Jun. 12, 2019, which claims priority to Chinese Patent Application No. 201811055961.7, filed on Sep. 11, 2018, the disclosure of which is hereby incorporated by reference in its entirety.

TECHNICAL FIELD

Embodiments of this application relate to the field of computer technologies, and in particular, to a resource scheduling method and apparatus.

BACKGROUND

During construction of a cloud data center, a carrier of the cloud data center invests a large amount of money in purchasing computing facilities such as a server and a switch, to provide a computing resource for a cloud computing service. To increase utilization of a computing resource of the cloud data center, the carrier uses resource overcommitment technologies such as virtualization to schedule computing tasks of different tenants to a same computing facility. A cloud host service is used as an example. A tenant selects, based on a task execution requirement of the tenant, a cloud host with a proper resource configuration from a cloud host type list provided by the carrier and leases the cloud host. When the tenant sends a request for starting a cloud host, the carrier selects, by using a public cloud scheduling system, one physical server from all physical servers in the cloud data center based on the resource configuration of the cloud host selected by the tenant, and starts a virtual machine on the physical server as the cloud host leased by the tenant. In this process, a proper virtual machine scheduling method can effectively reduce resource fragments in each physical server in the cloud data center, to ensure relatively high resource utilization.

Therefore, how to better schedule a resource is an urgent problem to be resolved.

SUMMARY

Embodiments of this application provide a resource scheduling method and apparatus, to improve service quality while increasing resource utilization.

According to a first aspect, an embodiment of this application provides a resource scheduling method. The method includes: when a first scheduling request message is obtained, determining a first resource server from a resource pool based on a first quantity of resources requested by the first scheduling request message, and scheduling the first quantity of resources in the first resource server, where the resource pool includes at least one resource server, and the first scheduling request message is used to request a resource for a first-type task; and when a second scheduling request message is obtained, if it is determined, based on a resource load rate of the resource pool, to schedule a resource for a task corresponding to the second scheduling request message, determining a second resource server from the resource pool based on a second quantity of resources requested by the second scheduling request message, and scheduling a third quantity of resources in the second resource server, where the third quantity is less than or equal to the second quantity, and the second scheduling request message is used to request a resource for a second-type task.

According to the foregoing method, first, when the first resource server and the second resource server are same resource servers, the first-type task and the second-type task may be scheduled for a same resource server. In this way, a server resource that is applied for by the first-type task but is not used can be effectively used, resource waste in a public cloud scenario is effectively avoided, and a public cloud carrier can reduce purchasing of hardware resources such as a server for executing the second-type task. This reduces service costs of the carrier.

In a possible design, after the second scheduling request message is obtained, the second scheduling request message may be further placed in a waiting queue, where the waiting queue includes a scheduling request message of at least one second-type task. In this way, that it is determined, based on a resource load rate of the resource pool, to schedule a resource for a task corresponding to the second scheduling request message may include: if it is determined that the resource load rate of the resource pool is less than a first threshold, and the task corresponding to the second scheduling request message is a task that is in the waiting queue and that requests a minimum quantity of resources or a task that has a longest waiting time, determining to schedule the resource for the task corresponding to the second scheduling request message.

In a possible design, the method further includes: if it is determined that the resource load rate of the resource pool is greater than or equal to the first threshold, selecting M second-type tasks from a plurality of tasks executed by the at least one resource server, and releasing resources occupied by the M second-type tasks, where M is an integer greater than 0.

In another possible design, the method further includes: if it is determined that a quantity of idle resources in the second resource server is less than a second threshold, selecting N second-type tasks from the plurality of tasks executed by the second resource server, and releasing resources occupied by the N second-type tasks, where N is an integer greater than 0.

According to the foregoing method, monitoring, prediction, and analysis may be performed on a resource load, to interrupt, in a timely manner, a second-type task in a resource server with a relatively high load, so as to avoid a case in which the second-type task preempts resource required by the first-type task, and avoid impact on resource usage of the first-type task.

In a possible design, the method further includes: placing the N second-type tasks in the waiting queue, where the waiting queue includes the scheduling request message of the at least one second-type task.

In a possible design, when the first resource server is determined from the resource pool based on the first quantity of resources requested by the first scheduling request message, a resource server whose quantity of idle resources is greater than the first quantity may be selected from the at least one resource server included in the resource pool as the first resource server.

In a possible design, when the second resource server is determined from the resource pool based on the second quantity of resources requested by the second scheduling request message, a resource server whose quantity of idle resources is greater than the third quantity may be selected from the at least one resource server included in the resource pool as the second resource server.

In the foregoing method, the first-type task may be a task of performing resource scheduling based on a quantity of requested resources, and the second-type task may be a task of performing resource scheduling based on a quantity of used resources.

According to a second aspect, an embodiment of this application provides a resource scheduling apparatus. The resource scheduling apparatus includes a processor, the processor is coupled to a memory, and the memory is configured to store an instruction. The processor is configured to execute the instruction stored in the memory, to perform the method in any one of the first aspect or the possible designs of the first aspect.

According to a third aspect, an embodiment of this application provides a resource scheduling apparatus, configured to implement the method in any one of the first aspect or the possible designs of the first aspect. The resource scheduling apparatus includes corresponding functional modules, for example, a first scheduler, a second scheduler, and a load control module, respectively configured to implement the steps in the foregoing method.

According to a fourth aspect, an embodiment of this application provides a computer-readable storage medium. The computer storage medium stores a computer-readable instruction. When a computer reads and executes the computer-readable instruction, the computer is enabled to perform the method in any one of any aspect or the possible designs of any one of any aspect.

According to a fifth aspect, an embodiment of this application provides a computer program product. When a computer reads and executes the computer program product, the computer is enabled to perform the method in any one of any aspect or the possible designs of any one of any aspect.

According to a sixth aspect, an embodiment of this application provides a chip. The chip is connected to a memory, and is configured to read and execute a software program stored in the memory, to implement the method in any one of any aspect or the possible designs of any one of any aspect.

According to a seventh aspect, an embodiment of this application provides a resource scheduling system, including the resource scheduling apparatus in the second aspect and a plurality of resource servers.

BRIEF DESCRIPTION OF DRAWINGS

FIG. 2 is a schematic flowchart of a resource scheduling method according to an embodiment of this application;

DESCRIPTION OF EMBODIMENTS

The following describes embodiments of this application in detail with reference to accompanying drawings of this specification.

Figure 1:
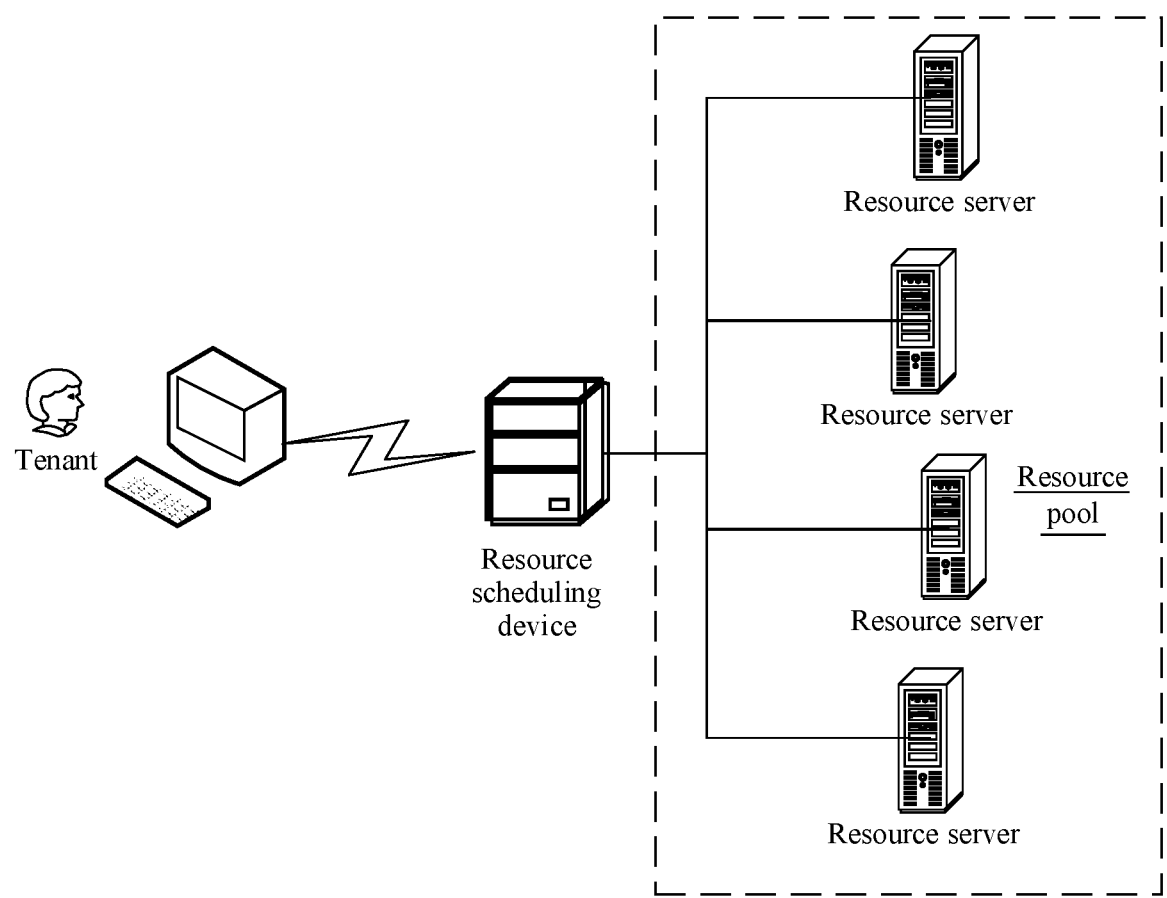
FIG. 1 is a schematic structural diagram of a resource scheduling system according to an embodiment of this application.

For ease of understanding of the embodiments of this application, a system applicable to the embodiments of this application is first described in detail by using a system architecture shown in FIG. 1 as an example. FIG. 1 is a schematic architectural diagram of a public cloud service system applicable to an embodiment of this application. As shown in FIG. 1, the public cloud service system includes a resource pool and a resource scheduling device for controlling the resource pool, where the resource pool may include at least one resource server.

A tenant separately submits scheduling request messages for different types of tasks to the resource scheduling device from different service interfaces by using a console (not shown in FIG. 1) in the resource scheduling device of the public cloud service. The resource scheduling device schedules resource servers from the resource pool based on the scheduling request messages for the different types of tasks, and schedules corresponding processing resources from the scheduled resource servers to the tenant for use.

The architecture and a service scenario described in the embodiments of this application are intended to describe the technical solutions in the embodiments of this application more clearly, and do not constitute a limitation on the technical solutions provided in the embodiments of this application. A person of ordinary skill in the art may know that, with evolution of the architecture and emergence of a new service scenario, the technical solutions provided in the embodiments of this application are also applicable to a similar system architecture.

With reference to the foregoing application scenario, FIG. 2 is a schematic flowchart of a resource scheduling method according to an embodiment of this application.

The method includes the following steps.

Step 201: When a resource scheduling device obtains a first scheduling request message, where the first scheduling request message is used to request a resource for a first-type task, the resource scheduling device determines a first resource server from a resource pool based on a first quantity of resources requested by the first scheduling request message, and schedules the first quantity of resources in the first resource server.

The task type herein refers to a service type corresponding to a task, and a task for executing a type of service may be referred to as a task of a type. The resource herein includes but is not limited to a processor resource, a storage resource, a bandwidth resource, and the like.

Step 202: When the resource scheduling device obtains a second scheduling request message, where the second scheduling request message is used to request a resource for a second-type task, if the resource scheduling device determines, based on a current resource load rate of the resource pool, to schedule a resource for a task corresponding to the second scheduling request message, the resource scheduling device determines a second resource server from the resource pool based on a second quantity of resources requested by the second scheduling request message, and schedules a third quantity of resources in the second resource server, where the third quantity is less than or equal to the second quantity.

The first resource server and the second resource server may be same resource servers, or may be two different resource servers. This is not limited in this embodiment of this application.

According to the foregoing embodiment, two different scheduling methods are used for two different types of tasks, so that resource utilization can be increased, costs of a carrier can be reduced, and impact on a service level agreement (SLA) sensitive task can be avoided. First, a method for performing scheduling based on a quantity of actually used resources is used for a system for performing scheduling based on a quantity of requested resources, so that the first-type task and the second-type task may be scheduled for a same resource server. In this way, resources that are applied for by the first-type task but are not used on a same resource server is effectively used, and a resource waste in a public cloud scenario can be effectively avoided. In addition, because the second-type task may be scheduled for resources spared from the first-type task, a public cloud carrier may reduce purchasing of hardware resources such as a server for executing the second-type task. This reduces service costs of the carrier.

Figure 3:
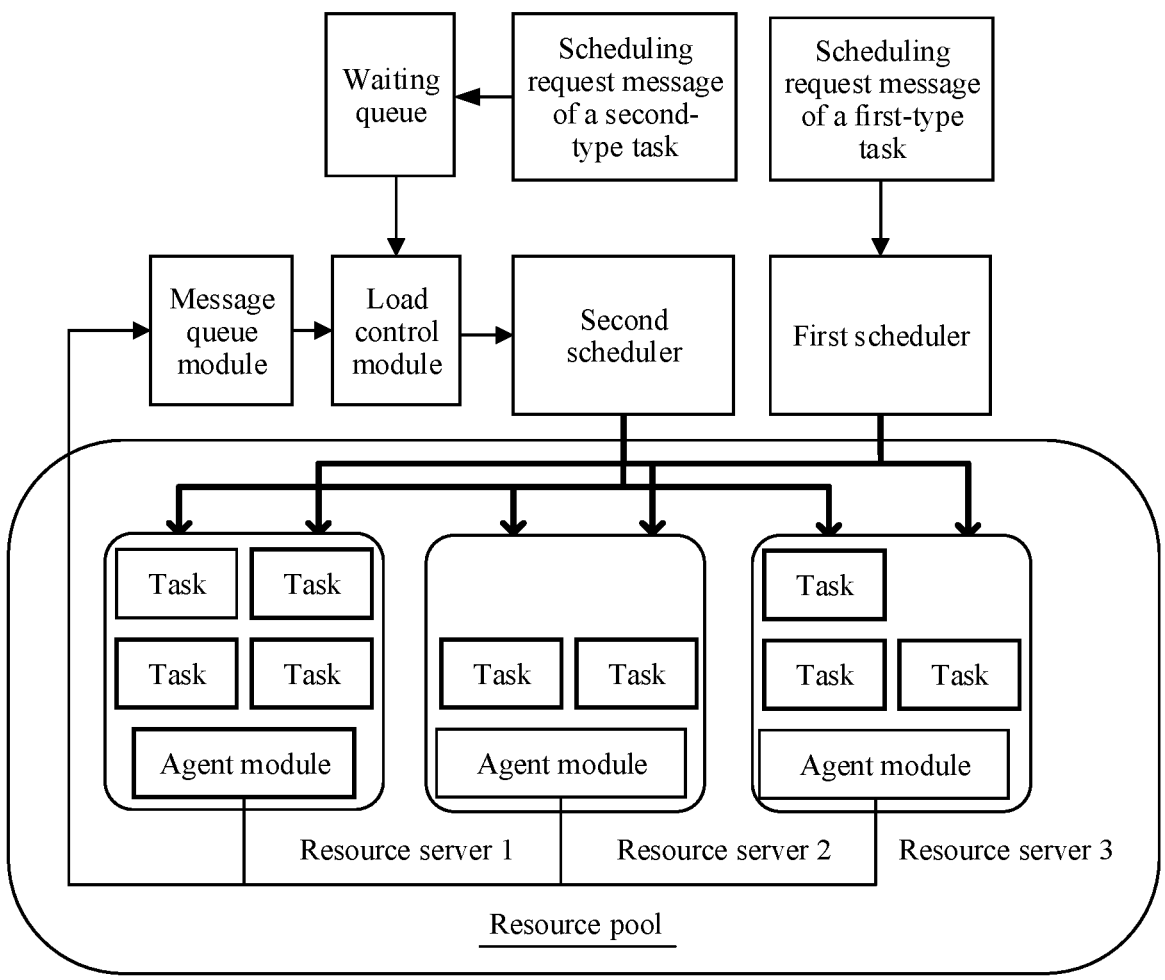
FIG. 3 is a structural framework diagram of a resource scheduling device according to an embodiment of this application.

FIG. 3 is a schematic architectural diagram of a resource scheduling device applicable to a public cloud service system according to an embodiment of this application. As shown in FIG. 3, the resource scheduling device includes modules such as a first scheduler, a second scheduler, a load control module, a waiting queue, and a message queue module. A scheduling request message of the first-type task may be submitted to the first scheduler, and a scheduling request message of the second-type task may be submitted to the second scheduler.

The first scheduler is configured to obtain the scheduling request message of the first-type task, and the second scheduler is configured to obtain the scheduling request message of the second-type task. The first-type task may be a task of performing resource scheduling based on a quantity of requested resources, and the second-type task may be a task of performing resource scheduling based on a quantity of used resources. In this embodiment of this application, the first-type task may also be referred to as an SLA sensitive task, and the second-type task may also be referred to as an SLA insensitive task. During execution of the SLA sensitive task, resources that do not exceed a quantity of requested resources of the SLA sensitive task can be obtained at any time based on a requirement of the SLA sensitive task. During execution of the SLA insensitive task, resources that are less than a quantity of requested resources of the SLA insensitive task may be obtained. In addition, when a resource pool is overloaded, resources that are being used by the SLA insensitive task may be reclaimed, thereby interrupting task execution.

In this embodiment of this application, a corresponding type, namely, the first type and the second type, is preset for each task. Resources can be applied for each type of task only by using a corresponding scheduler, so that resource utilization can be increased by using the second-type task, and impact on the first-type task is avoided.

After obtaining the scheduling request message of the first-type task, the first scheduler ensures, based on a quantity of requested resources of the first-type task, that a quantity of resources equal to the quantity of requested resources of the first-type task can be obtained for the type of task at any time.

After obtaining the scheduling request message of the second-type task, the second scheduler does not allocate a quantity of requested resources of the second-type task at the beginning, but first places the scheduling request message of the task in the waiting queue for waiting. When determining, based on a resource load rate of the resource pool, to schedule a resource for the type of task, the second scheduler allocates a maximum quantity of resources that is not greater than the quantity of requested resources of the second-type task to the second-type task based on a quantity of actually used resources of the second-type task. The second scheduler may monitor and predict an actually used resource of each resource server by using the load control module, and when a predicted value of a quantity of actually used resources of a task increases, close some second-type tasks in a timely manner, to ensure that the first-type task can have sufficient resources for use.

Each resource server in the resource pool includes an agent module. The agent module is responsible for executing a resource allocation decision of a scheduler, and is also responsible for monitoring a resource load of the resource server in which the agent module is located and a quantity of actually used resources of each task in the resource server. After selecting one resource server to execute a task, the scheduler sends data and information related to the task to an agent module in the resource server. According to the decision of the scheduler, the agent module prepares an execution environment for the task to be executed in the resource server, allocates a resource required by the task, and creates a task instance. When the scheduler decides to interrupt some SLA insensitive tasks in a resource server, the scheduler transfers related information of the interrupted tasks to an agent module in the resource server, and the agent module interrupts execution of the tasks and releases resources occupied by the tasks.

In this embodiment of this application, the agent module in each resource server periodically reads data of the actually used resources of each task in the resource server. After analysis and summarization, the agent module in each resource server periodically sends monitoring data to the message queue module. The monitoring data includes but is not limited to a resource load rate of the resource server, a quantity of actually used resources of each type of task executed by the resource server, a task type of each type of task executed by the resource server, and the like.

Figure 4:
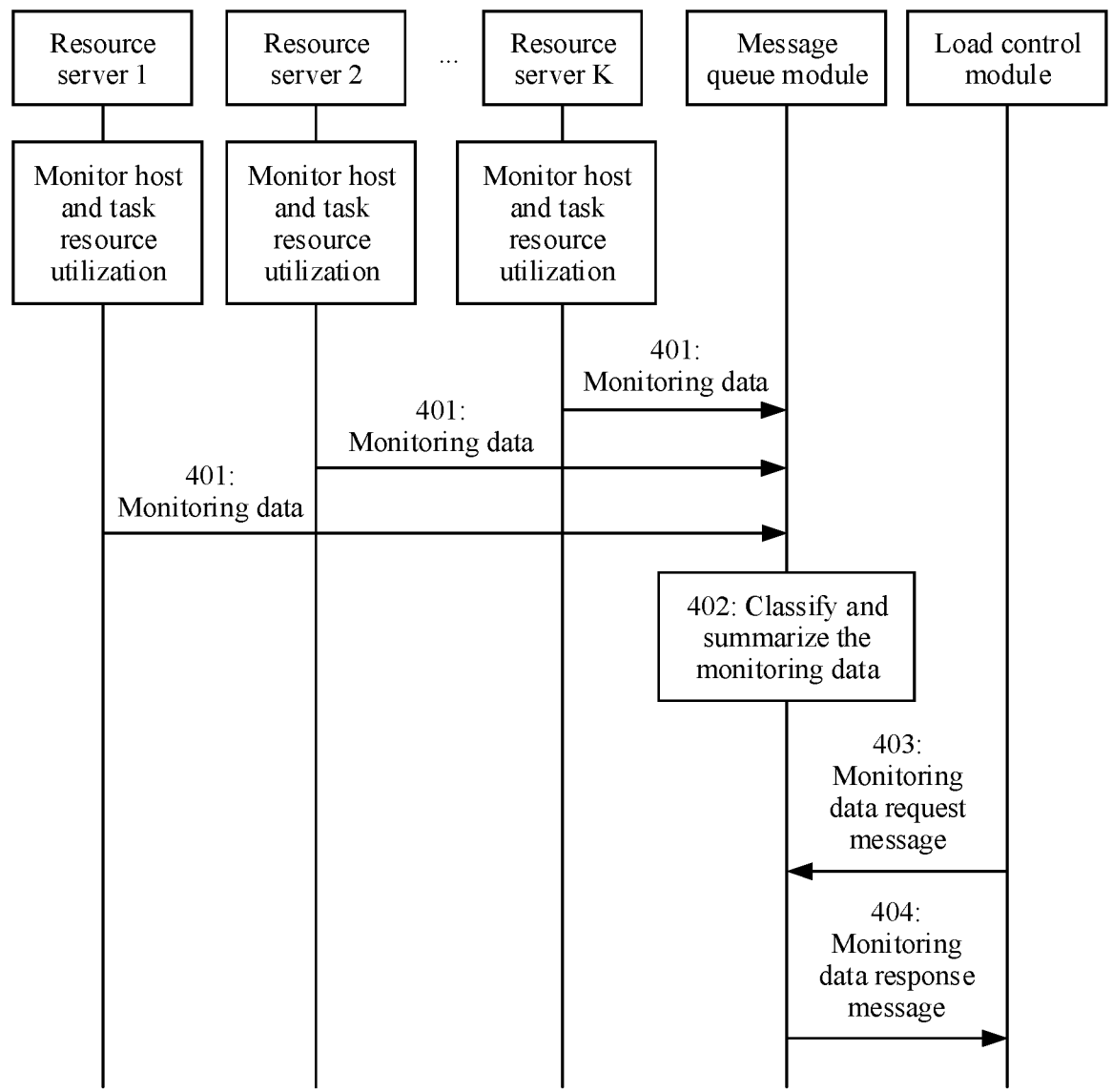
FIG. 4 is a schematic flowchart of sending monitoring data according to an embodiment of this application.

For example, FIG. 4 is a schematic flowchart of sending monitoring data according to an embodiment of this application.

Step 401: A resource server 1 to a resource server K included in a resource pool periodically send monitoring data to a message queue module.

Step 402: The message queue module classifies and summarizes the monitoring data sent by the resource servers, and finally provides the monitoring data for the load control module for reading.

Step 403: The load control module periodically sends a monitoring data request message to the message queue module, where the monitoring data request message is used to request to obtain the monitoring data.

Correspondingly, in step 404, the message queue module sends a monitoring data response message to the load control module, where the monitoring data response message includes the monitoring data requested by the load control module.

The load control module reads monitoring data of each agent module in the message queue module, predicts and analyzes, in a future period of time (for example, one hour), a resource load of the resource pool and a quantity of actually used resources of a tenant task based on the read monitoring data, and performs logical determining in two aspects based on a prediction result. On the one hand, the load control module determines, based on the prediction result, whether to select a task cached in a waiting queue for execution. When the predicted load is relatively low, the load control module obtains a scheduling request message (a scheduling request message that is still executed or whose execution is interrupted) from the waiting queue, screens a task suitable for execution from the waiting queue, and allocates a computing resource to the task by using a scheduler. On the other hand, the load control module further needs to determine whether a running SLA insensitive task needs to be interrupted. When the resource load predicted by a resource server is relatively high and there is a risk that a quantity of actually used resources of a task exceeds a server resource capacity, the load control model transfers information about the resource server to a second scheduler, and the second scheduler selects to close some SLA insensitive tasks in the resource server, to ensure that sufficient resources can be obtained when a remaining task is executed. It should be noted that how the load control module specifically predicts and analyzes the resource load of the resource pool and the quantity of actually used resources of the tenant task based on the read monitoring data is not limited in this embodiment of this application, and details are not described herein.

Figure 5:
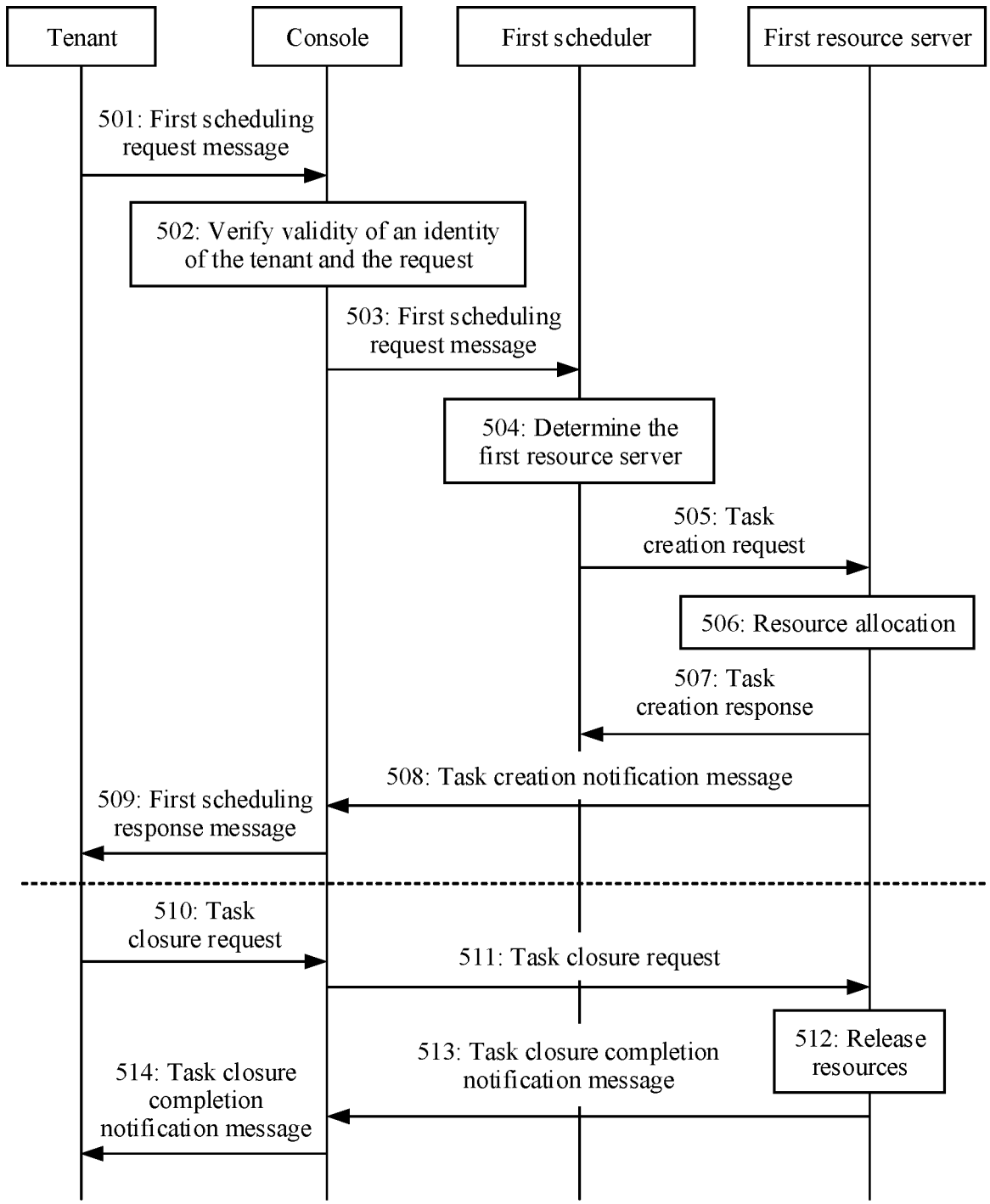
FIG. 5 is a schematic diagram of resource scheduling of a first-type task according to an embodiment of this application.

In an embodiment of this application, a procedure of creating and closing a first-type task may be shown in FIG. 5. The procedure includes following processing steps.

Step 501: A tenant sends a first scheduling request message to a console of a resource scheduling device. The first scheduling request message is used to request a first quantity of resources for the first-type task, and the first scheduling request message may further include identity information of the tenant, information about a corresponding task, and the like. This is not limited in this embodiment of this application, and details are not described herein.

Step 502: The console of the resource scheduling device verifies validity of the identity information of the tenant and the first scheduling request message. A specific manner of performing verification by the console is not limited in this embodiment of this application, and details are not described herein. After authentication performed by the console succeeds, step 503 is performed. After the authentication performed by the console fails, a request of the tenant is rejected. The following provides description by using an example in which the authentication succeeds.

Step 503: The console of the resource scheduling device submits the first scheduling request message to a first scheduler.

Step 504: The first scheduler determines a first resource server from a resource pool based on the first quantity of resources requested by the first scheduling request message. The first scheduler may select, from at least one resource server included in the resource pool, a resource server whose quantity of idle resources is greater than the first quantity as the first resource server.

Figure 6:
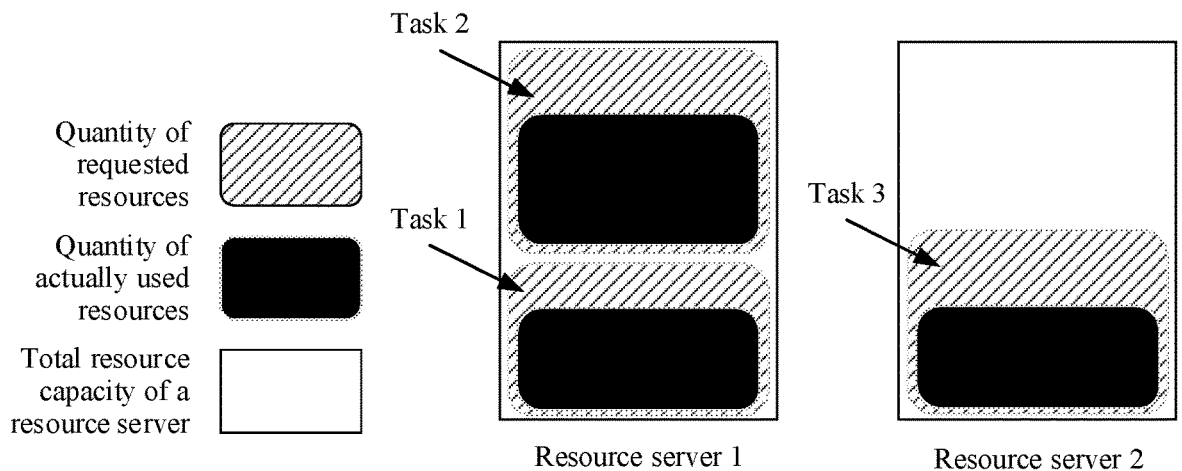
FIG. 6 is a schematic diagram of resource scheduling according to an embodiment of this application.

To ensure that the first-type task submitted by the tenant can obtain sufficient resources, the first scheduler of a public cloud may perform resource based on a quantity of requested resources of a task. As shown in FIG. 6, it is assumed that the tenant submits a task 1, a task 2, and a task 3 in sequence. The first scheduler performs resource scheduling based on quantities of requested resources of the tasks, and schedules the task 1 and the task 2 to a resource server 1. However, when the tenant submits a request for executing the task 3, if resources that are not actually used are still left in the resource server 1, but a quantity of remaining resources is less than a quantity of requested resources of the task 3, the first scheduler schedules the task 3 to an idle resource server 2.

Step 505: The first scheduler sends a task creation request to the first resource server, where the task creation request is used to request to create a task corresponding to the first scheduling request message, and the request is used to schedule the first quantity of resources for the task.

Step 506: An agent module in the first resource server creates the task based on the task creation request, and schedules the first quantity of resources.

Step 507: The first resource server sends a task creation response to the first scheduler, where the task creation response is used to indicate a request result of the task creation request.

Step 508: The first resource server sends a task creation notification message to the console, where the task creation notification message is used to indicate a request result of the first scheduling request message.

Step 509: The console sends a first scheduling response message to the tenant based on the task creation notification message, where the first scheduling response message is used to indicate the request result of the first scheduling request message.

According to the foregoing process, the resources are scheduled for the task corresponding to the first scheduling request message based on the first scheduling request message of the tenant, and the task is created.

Further, if it is determined that a resource load rate of the resource pool is greater than or equal to a first threshold, M second-type tasks may be selected from a plurality of tasks executed by the at least one resource server, and resources occupied by the M second-type tasks are released, where m is an integer greater than 0. Optionally, the M second-type tasks may be further placed in a waiting queue, and wait to be subsequently invoked for execution.

Further, in this embodiment of this application, one resource server may simultaneously execute the first-type task and the second-type task. The first scheduler analyzes and predicts a resource load of each resource server in a future period of time by using a quantity of resources used by each task in the resource server. When the first scheduler determines that a quantity of idle resources in the first resource server is less than a second threshold, or a load rate of the first resource server is greater than a preset load rate, for example, greater than 90%, the first scheduler selects at least one second-type task from the first resource server, and releases resources occupied by the at least one second-type task. Therefore, in this embodiment of this application, the first-type task is scheduled based on a quantity of requested resources, and a second-type task in a resource server with a relatively high load is interrupted in a timely manner by monitoring, predicting, and analyzing a resource load, to avoid a case in which the second-type task preempts resources required by the first-type task, and avoid impact on resource usage of the first-type task. To be specific, according to the foregoing method, resource allocation of the first-type task can be preferentially ensured.

Figure 7:
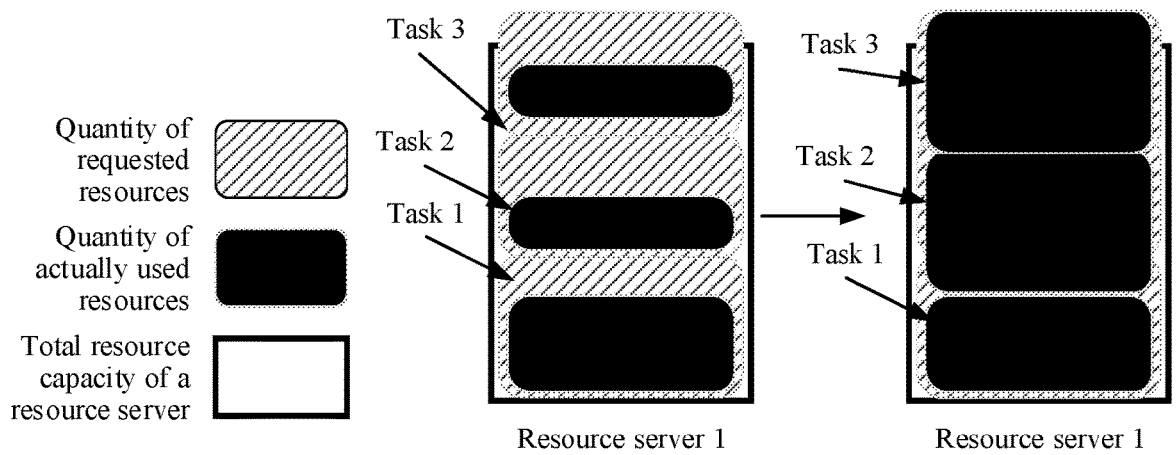
FIG. 7 is a schematic diagram of resource scheduling according to an embodiment of this application.

For example, as shown in FIG. 7, it is assumed that the tenant submits a task 1, a task 2, and a task 3 in sequence. The task 1 is a first-type task, and the task 2 and the task 3 are second-type tasks. The first scheduler performs resource scheduling based on a quantity of requested resources of the task, and schedules the task 1 to a resource server 1. A second scheduler performs resource scheduling based on quantities of used resources of the tasks, and schedules the task 2 and the task 3 to the resource server 1. A quantity of resources scheduled for the task 1 is equal to the quantity of requested resources of the task 1, and both quantities of resources scheduled for the task 2 and the task 3 are less than the respective quantities of requested resources. As time changes, quantities of actually used resources of the task 2 and the task 3 gradually increase and reach the respective quantities of requested resources, and quantities of actually used resources of the three tasks are about to exceed a total resource capacity of the resource server 1. In this case, execution of some tasks may need to be interrupted, to ensure that another task can obtain sufficient computing resources. If the first-type task is interrupted in an execution process, experience of the tenant is severely affected, and consequently, a brand and reputation of a carrier are damaged. Therefore, the second-type task may be forcibly interrupted. In this case, execution of both the task 2 and the task 3 may be interrupted, and resources may be released. Further, the at least one second-type task may be further placed in the waiting queue again, and wait to be subsequently invoked for re-execution.

Optionally, in this embodiment of this application, the tenant may further actively request to close the task. Still referring to FIG. 5, for details, refer to the following procedure.

Step 510: The tenant sends a task closure request to the console, where the task closure request is used to request to close the task corresponding to the first scheduling request message.

Step 511: The console forwards the task closure request to the first resource server.

Step 512: The first resource server closes, based on the task closure request, the task corresponding to the first scheduling request message, and releases the resources scheduled for the task.

Step 513: The first resource server sends a task closure completion notification message to the console, where the task closure completion notification message is used to indicate a task closure result.

Step 514: The console forwards the task closure completion notification message to the tenant.

Figure 8A:
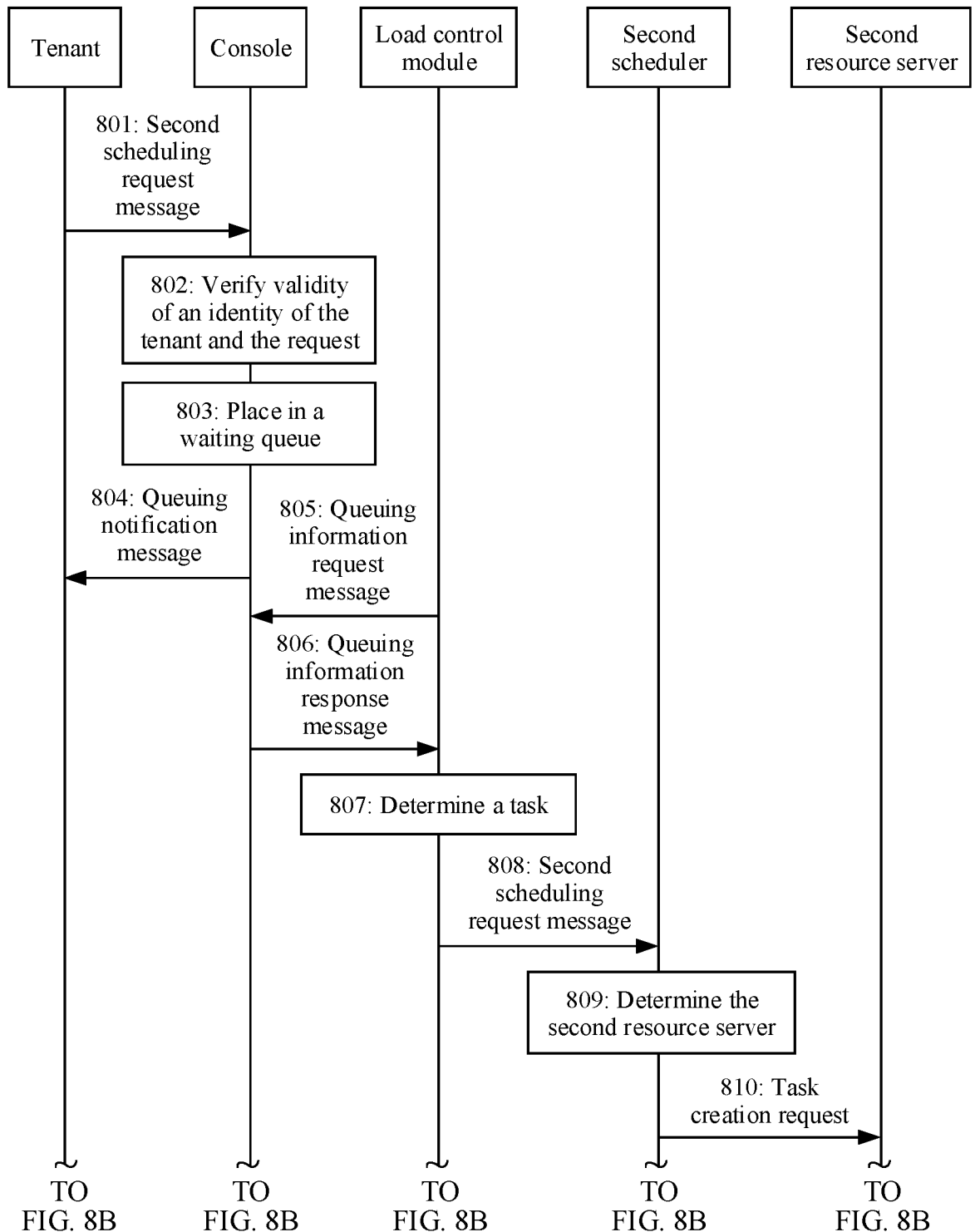
FIG. 8A and FIG. 8B are a schematic diagram of resource scheduling of a second-type task according to an embodiment of this application.
Figure 8B:
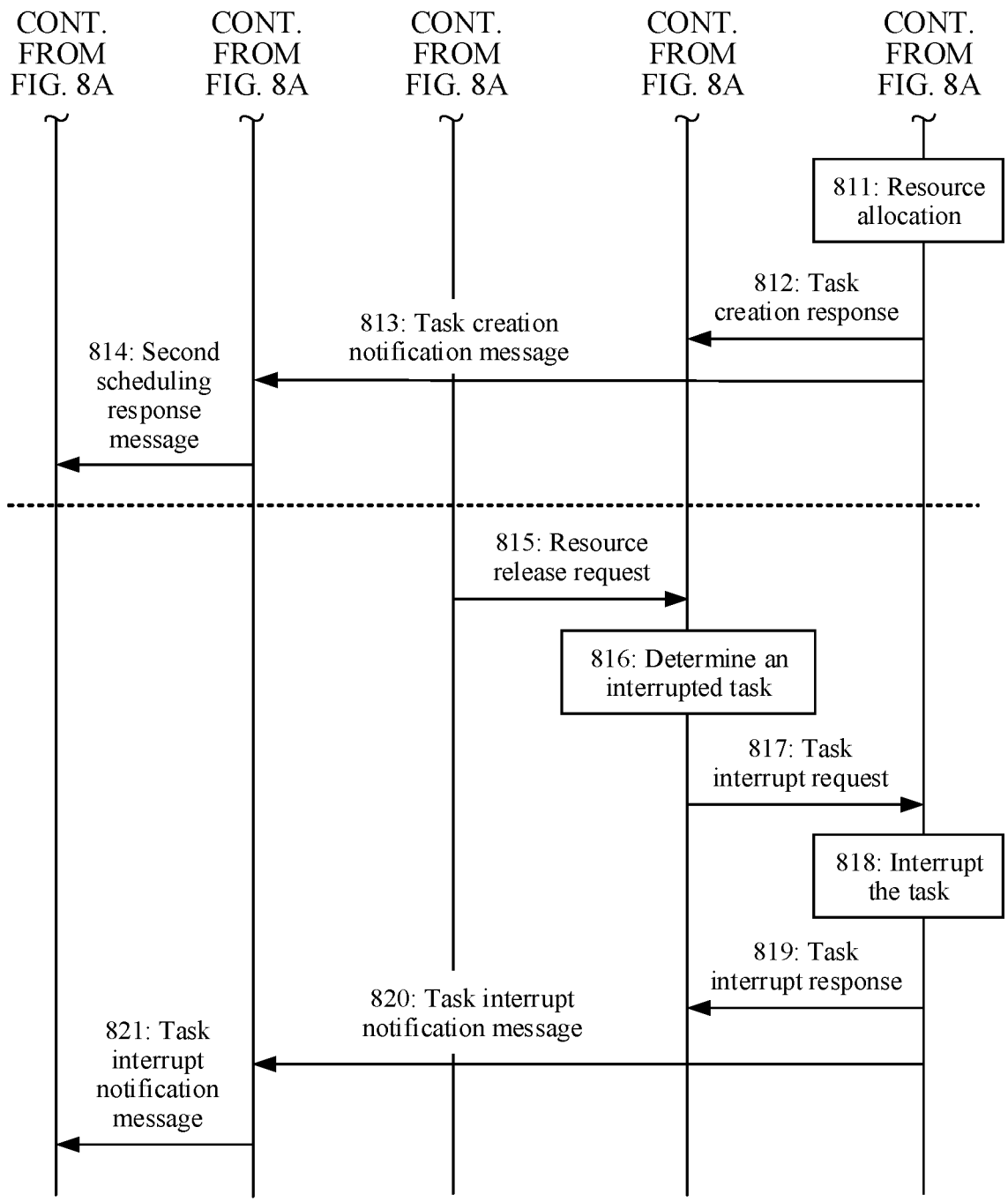

In this embodiment of this application, different from the first-type task, a scheduling request message of the second-type task cannot immediately obtain the requested resources, but needs to be queued. Specifically, a procedure of creating and interrupting a second-type task may be shown in FIG. 8A and FIG. 8B. Specifically, the procedure may include the following steps.

Step 801: A tenant sends a second scheduling request message to a console of a resource scheduling device. The second scheduling request message is used to request a second quantity of resources for the second-type task, and the second scheduling request message may further include identity information of the tenant, information about a corresponding task, and the like. This is not limited in this embodiment of this application, and details are not described herein.

Step 802: The console of the resource scheduling device verifies validity of the identity information of the tenant and the second scheduling request message. A specific manner of performing verification by the console is not limited in this embodiment of this application, and details are not described herein. After authentication performed by the console succeeds, step 803 is performed. After the authentication performed by the console fails, a request of the tenant is rejected. The following provides description by using an example in which the authentication succeeds.

Step 803: The control console places the second scheduling request message in a waiting queue.

Step 804: The console sends a queuing notification message to the tenant, where the queuing notification message is used to indicate that the second scheduling request message is located in the waiting queue.

Step 805: A load control module sends a queuing information request message, where the queuing information request message is used to request to obtain all scheduling request messages that are queuing in the waiting queue.

Step 806: The load control module receives a queuing information response message, where the queuing information response message includes information such as all of the scheduling request messages that are queuing in the waiting queue.

Step 807: The load control module determines to schedule a resource for a task corresponding to the second scheduling request message. It should be noted that, when predicting that a resource load rate of a resource pool is less than a first threshold, the load control module screens the scheduling request messages that are queuing in the waiting queue. Then, a screened scheduling request message and a load rate of each resource server are used as a task scheduling request and submitted to a second scheduler.

For example, if it is determined that the resource load rate of the resource pool is less than the first threshold, and the task corresponding to the second scheduling request message is a task that is in the waiting queue and that requests a minimum quantity of resources or a task that has a longest waiting time, it may be determined to schedule the resource for the task corresponding to the second scheduling request message.

Step 808: The load control module sends the second scheduling request message to the second scheduler.

Step 809: The second scheduler determines a second resource server from the resource pool based on the second quantity of resources requested by the second scheduling request message. The second scheduler may select, from at least one resource server included in the resource pool, a resource server whose quantity of idle resources is greater than a third quantity as the second resource server.

In this embodiment of this application, the third quantity may be a quantity of actually used resources of the task corresponding to the second scheduling request message, or may be a product of the second quantity and a budget weight value. The preset weight value is a number greater than 0 and less than or equal to 1.

Figure 9:
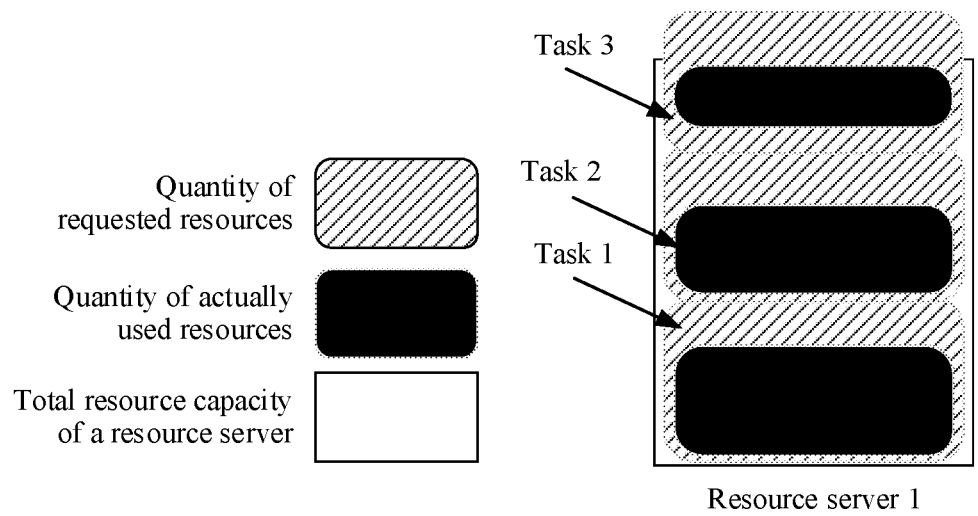
FIG. 9 is a schematic diagram of resource scheduling according to an embodiment of this application.

To ensure that a first-type task submitted by the tenant can obtain sufficient resources and increase resource utilization, the second scheduler of a public cloud may perform resource scheduling based on a quantity of used resources of a task. As shown in FIG. 9, it is assumed that the tenant submits a task 1, a task 2, and a task 3 in sequence. The task 1 is a first-type task, and the task 2 and the task 3 are second-type tasks. A first scheduler performs resource scheduling based on a quantity of requested resources of the task, and schedules the task 1 to a resource server 1. The second scheduler performs resource scheduling based on a quantity of used resources of the task, and schedules the task 2 to the resource server 1. When the tenant submits a request for executing the task 3, if resources that are not actually used are still left in the resource server 1, but a quantity of remaining resources is less than a quantity of requested resources of the task 3, to increase resource utilization, the second scheduler may still schedule the task 3 to the resource server 1. In this way, resource fragments (a resource that cannot be allocated to a cloud host of the tenant) in each resource server in a cloud data center can be effectively avoided, and high resource utilization is ensured.

Step 810: The second scheduler sends a task creation request to the second resource server, where the task creation request is used to request to create the task corresponding to the second scheduling request message, and the request is used to schedule the third quantity of resources for the task.

Step 811: An agent module in the second resource server creates the task based on the task creation request, and schedules the third quantity of resources.

Step 812: The second resource server sends a task creation response to the second scheduler, where the task creation response is used to indicate a request result of the task creation request.

Step 813: The second resource server sends a task creation notification message to the console, where the task creation notification message is used to indicate a request result of the second scheduling request message.

Step 814: The console sends a second scheduling response message to the tenant based on the task creation notification message, where the second scheduling response message is used to indicate the request result of the second scheduling request message.

According to the foregoing process, the resource is scheduled for the task corresponding to the second scheduling request message based on the second scheduling request message of the tenant, and the task is created.

Further, in this embodiment of this application, one resource server may simultaneously execute the first-type task and the second-type task. If it is determined that a quantity of idle resources in the second resource server is less than a second threshold, N second-type tasks are selected from a plurality of tasks executed by the second resource server, and resources occupied by the N second-type tasks are released, where N is an integer greater than 0. Optionally, the N second-type tasks may be further placed in the waiting queue, and wait to be subsequently invoked for execution. For details, still refer to FIG. 8A and FIG. 8B, and the following procedure may be further included.

Step 815: When predicting that the quantity of idle resources in the second resource server is less than the second threshold, the load control module sends a resource release request to the second scheduler. The resource release request is used to request to release some resources.

Step 816: The second scheduler determines at least one second-type task whose execution needs to be interrupted. The second scheduler may determine M second-type tasks that use a largest quantity of resources as the tasks whose execution needs to be interrupted, or may determine, according to another method, the task whose execution needs to be interrupted. The following provides description by using an example in which the second scheduler determines to interrupt the task corresponding to the second scheduling request message. Another case is not described.

Step 817: The second scheduler sends a task interrupt request to the second resource server, where task interrupt request is used to request to interrupt execution of the task corresponding to the second scheduling request message and release the corresponding resources.

Step 818: The second resource server interrupts, based on the task interrupt request, execution of the task corresponding to the second scheduling request message, and releases the resources scheduled for the task.

Step 819: The second resource server sends a task interrupt response to the second scheduler, where the task interrupt response is used to indicate a task interrupt result.

Step 820: The second resource server sends a task interrupt notification message to the console, where the task interrupt notification message is used to indicate that execution of the task corresponding to the second scheduling request message is interrupted.

Step 821: The console forwards the task interrupt notification message to the tenant.

According to the foregoing method, in this embodiment of this application, based on a difference between tenant tasks in a public cloud environment, an SLA sensitive task is preferentially scheduled based on a quantity of requested resources, to ensure that each SLA sensitive task can obtain sufficient resources during execution. An SLA insensitive task is scheduled based on a quantity of actually used resources. When resources requested but not used by the SLA sensitive task are fully used, creation and interruption of the SLA insensitive task are dynamically controlled through load monitoring and prediction, to avoid impact on resource usage of the SLA sensitive task.

Figure 10:
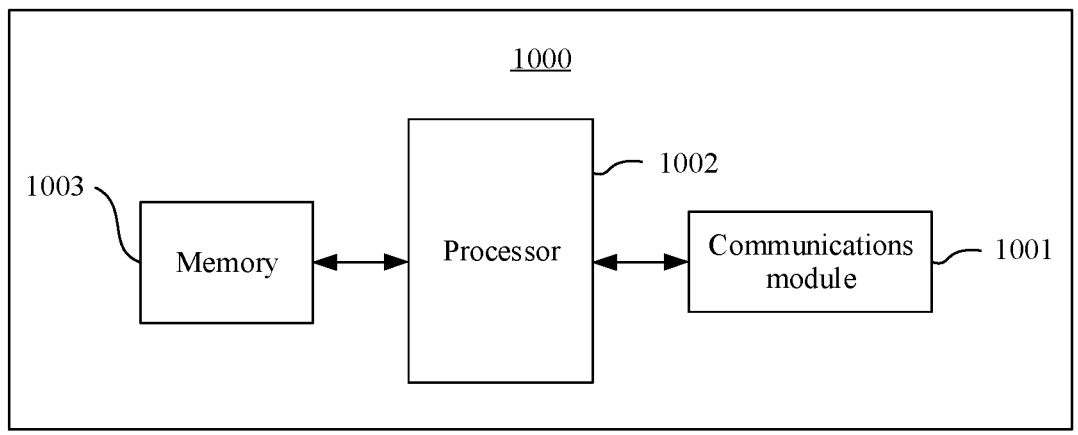
FIG. 10 is a schematic structural diagram of a resource scheduling apparatus according to an embodiment of this application.

FIG. 10 is a schematic structural diagram of a resource scheduling apparatus 1000 according to an embodiment of this application. The apparatus 1000 includes a communications module 1001, a processor 1002, a memory 1003, and the like.

The communications module 1001 in this embodiment of this application may be a communications chip having a wired or wireless communication capability, for example, a radio frequency transceiver or a network cable port, and is configured to perform processing of obtaining the first scheduling request message and the second scheduling request message in the foregoing method procedure.

The processor 1002 in this embodiment of this application may be an integrated circuit chip, and has a signal processing capability. In an implementation process, the steps in the foregoing method embodiment may be completed by using a hardware integrated logical circuit in the processor or an instruction in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The methods, the steps, and logical block diagrams that are disclosed in the embodiments of this application may be implemented or performed. The general-purpose processor may be a microprocessor, or the processor may be any conventional processor or the like. With reference to the steps of the method disclosed in the embodiment of this application, operations in the foregoing process such as determining whether to schedule a resource server, and scheduling corresponding resources based on a corresponding scheduling request message in the determined resource server may be implemented, and a task for which resources need to be released may be further selected, and the occupied server resources are released for the selected task.

The memory 1003 in this embodiment of this application may be a mature storage medium in the art, for example, a random access memory, a flash memory, a read-only memory, a programmable read-only memory, an electrically erasable programmable memory, or a register. The processor 1002 reads information in the memory 1003, and may complete the steps in the foregoing method in combination with hardware of the processor 1002.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may be stored in a computer readable memory that can instruct the computer or the another programmable data processing device to work in a specific manner, so that the instructions stored in the computer readable memory generate an artifact that includes an instruction apparatus. The instruction apparatus implements the specific function in one or more processes in the flowcharts and/or in one or more blocks in the block diagrams.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A cloud computing resource scheduling method, performed by a resource scheduling apparatus comprising a processor and a memory, the method comprising:
   obtaining a first scheduling request message;
   determining a first resource server from a resource pool based on a first quantity of resources requested by the first scheduling request message;
   scheduling the first quantity of resources in the first resource server, wherein the resource pool comprises at least one resource server, and the first scheduling request message is used to request a resource for a first-type task, wherein the first-type task is a service level agreement (SLA) sensitive task;
   obtaining a second scheduling request message;
   placing the second scheduling request message in a waiting queue, wherein the waiting queue comprises a scheduling request message of at least one second-type task, wherein the second-type task is a service level agreement (SLA) insensitive task;
   determining, based on a resource load rate of the resource pool, to schedule a resource for a task corresponding to the second scheduling request message, the resource load rate indicating a resource utilization rate of the resource pool;
   determining a second resource server from the resource pool based on a second quantity of resources requested by the second scheduling request message; and
   scheduling a third quantity of resources in the second resource server, wherein the third quantity of resources is less than the second quantity of resources, wherein the second scheduling request message is used to request a resource for a second-type task, and wherein the second-type task is executed by the second resource server with the third quantity of resources,
   wherein the determining, based on the resource load rate of the resource pool, to schedule the resource for the task corresponding to the second scheduling request message comprises:
      determining that the resource load rate of the resource pool is less than a first threshold, and the task corresponding to the second scheduling request message is a task that is in the waiting queue and that requests a minimum quantity of resources among tasks corresponding to second scheduling request messages in the waiting queue.

2. The method according to claim 1, further comprising:
   determining that the resource load rate of the resource pool is greater than or equal to the first threshold;
   selecting M second-type tasks from a plurality of tasks executed by the at least one resource server, and
   releasing resources occupied by the M second-type tasks, wherein M is an integer greater than 0.

3. The method according to claim 1, further comprising:
   determining that a quantity of idle resources in the second resource server is less than a second threshold;
   selecting N second-type tasks from the plurality of tasks executed by the second resource server; and
   releasing resources occupied by the N second-type tasks, wherein N is an integer greater than 0.

4. The method according to claim 3, further comprising:
   placing the N second-type tasks in the waiting queue, wherein the waiting queue comprises the scheduling request message of the at least one second-type task.

5. The method according to claim 1, wherein the determining the first resource server from the resource pool based on the first quantity of resources requested by the first scheduling request message comprises:
   selecting, from the at least one resource server comprised in the resource pool, a resource server whose quantity of idle resources is greater than the first quantity of resources as the first resource server.

6. The method according to claim 1, wherein the determining the second resource server from the resource pool based on the second quantity of resources requested by the second scheduling request message comprises:
   selecting, from the at least one resource server comprised in the resource pool, a resource server whose quantity of idle resources is greater than the third quantity of resources as the second resource server.

7. The method according to claim 1, wherein the first-type task is a scheduled with resources based on a quantity of requested resources.

8. The method according to claim 1, wherein the second-type task is scheduled with resources based on resource usage.

9. A cloud computing resource scheduling apparatus, comprising at least one processor, wherein the at least one processor is coupled to at least one memory; and wherein the at least one processor is configured to execute a computer program or an instruction stored in the at least one memory, so that the apparatus is configured to perform a resource scheduling method comprising:

obtaining a first scheduling request message;

determining a first resource server from a resource pool based on a first quantity of resources requested by the first scheduling request message;

scheduling the first quantity of resources in the first resource server, wherein the resource pool comprises at least one resource server, and the first scheduling request message is used to request a resource for a first-type task, wherein the first-type task is a service level agreement (SLA) sensitive task;

obtaining a second scheduling request message;

placing the second scheduling request message in a waiting queue, wherein the waiting queue comprises a scheduling request message of at least one second-type task, wherein the second-type task is a service level agreement (SLA) insensitive task;

determining, based on a resource load rate of the resource pool, to schedule a resource for a task corresponding to the second scheduling request message, the resource load rate indicating a resource utilization rate of the resource pool;

determining a second resource server from the resource pool based on a second quantity of resources requested by the second scheduling request message; and scheduling a third quantity of resources in the second resource server, wherein the third quantity of resources is less than the second quantity of resources, wherein the second scheduling request message is used to request a resource for a second-type task, and wherein the second-type task is executed by the second resource server with the third quantity of resources, wherein the determining, based on the resource load rate of the resource pool, to schedule the resource for the task corresponding to the second scheduling request message comprises:

determining that the resource load rate of the resource pool is less than a first threshold, and the task corresponding to the second scheduling request message is a task that is in the waiting queue and that requests a minimum quantity of resources among tasks corresponding to second scheduling request messages in the waiting queue.

10. The apparatus according to claim 9, wherein the resource scheduling method further comprises:

determining that the resource load rate of the resource pool is greater than or equal to the first threshold;

selecting M second-type tasks from a plurality of tasks executed by the at least one resource server, and releasing resources occupied by the M second-type tasks, wherein M is an integer greater than 0.

11. The apparatus according to claim 9, wherein the resource scheduling method further comprises:

determining that a quantity of idle resources in the second resource server is less than a second threshold;

selecting N second-type tasks from the plurality of tasks executed by the second resource server; and releasing resources occupied by the N second-type tasks, wherein N is an integer greater than 0.

12. The apparatus according to claim 11, wherein the resource scheduling method further comprises:

placing the N second-type tasks in the waiting queue, wherein the waiting queue comprises the scheduling request message of the at least one second-type task.

13. The apparatus according to claim 9, wherein the determining the first resource server from the resource pool based on the first quantity of resources requested by the first scheduling request message comprises:

selecting, from the at least one resource server comprised in the resource pool, a resource server whose quantity of idle resources is greater than the first quantity of resources as the first resource server.

14. The apparatus according to claim 9, wherein the determining the second resource server from the resource pool based on the second quantity of resources requested by the second scheduling request message comprises:

selecting, from the at least one resource server comprised in the resource pool, a resource server whose quantity of idle resources is greater than the third quantity of resources as the second resource server.

15. The apparatus according to claim 9, wherein the first-type task is scheduled with resources based on a quantity of requested resources.

16. The apparatus according to claim 9, wherein the second-type task is scheduled with resources based on resource usage.

17. A non-transitory computer readable storage medium, comprising a program or an instruction, wherein when the program or the instruction is executed by a computer, the computer is configured to perform a cloud computing resource scheduling method, the cloud computing resource scheduling method comprising:

obtaining a first scheduling request message;

determining a first resource server from a resource pool based on a first quantity of resources requested by the first scheduling request message;

scheduling the first quantity of resources in the first resource server, wherein the resource pool comprises at least one resource server, and the first scheduling request message is used to request a resource for a first-type task, wherein the first-type task is a service level agreement (SLA) sensitive task;

obtaining a second scheduling request message;

placing the second scheduling request message in a waiting queue, wherein the waiting queue comprises a scheduling request message of at least one second-type task, wherein the second-type task is a service level agreement (SLA) insensitive task;

determining, based on a resource load rate of the resource pool, to schedule a resource for a task corresponding to the second scheduling request message, the resource load rate indicating a resource utilization rate of the resource pool;

determining a second resource server from the resource pool based on a second quantity of resources requested by the second scheduling request message; and scheduling a third quantity of resources in the second resource server, wherein the third quantity of resources is less than the second quantity of resources, wherein the second scheduling request message is used to request a resource for a second-type task, and wherein the second-type task is executed by the second resource server with the third quantity of resources, wherein the determining, based on the resource load rate of the resource pool, to schedule the resource for the task corresponding to the second scheduling request message comprises:

determining that the resource load rate of the resource pool is less than a first threshold, and the task corresponding to the second scheduling request message is a task that is in the waiting queue and that requests a minimum quantity of resources or a task that has a longest waiting time among tasks corresponding to second scheduling request messages in the waiting queue.

* * * * *